INVENTORS
Charles Stang, Jr.
Wilbur S. McMann
BY Harness, Dickey & Pierce
ATTORNEYS United States Patent Office 3,486,693
Patented Dec. 30, 1969

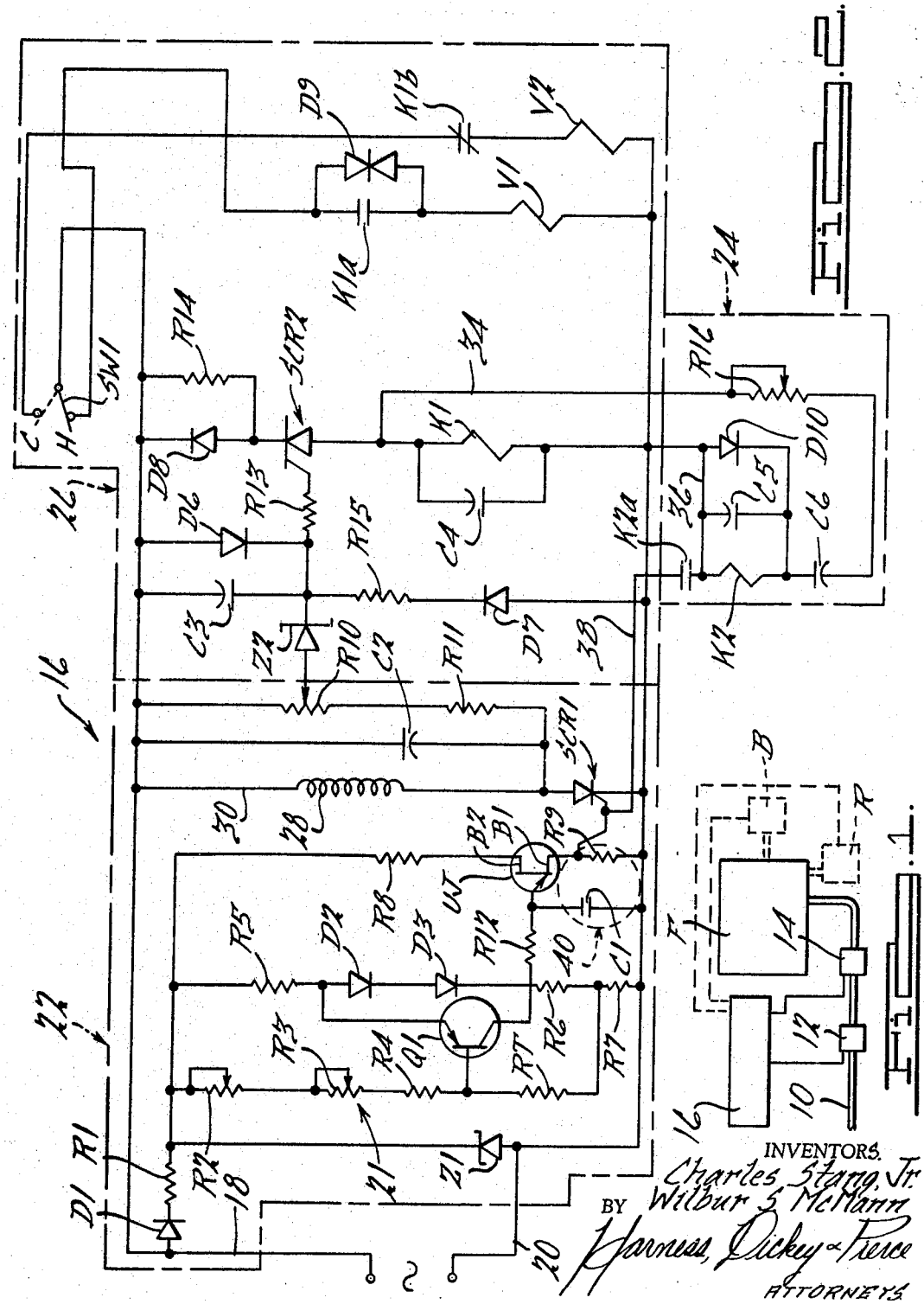

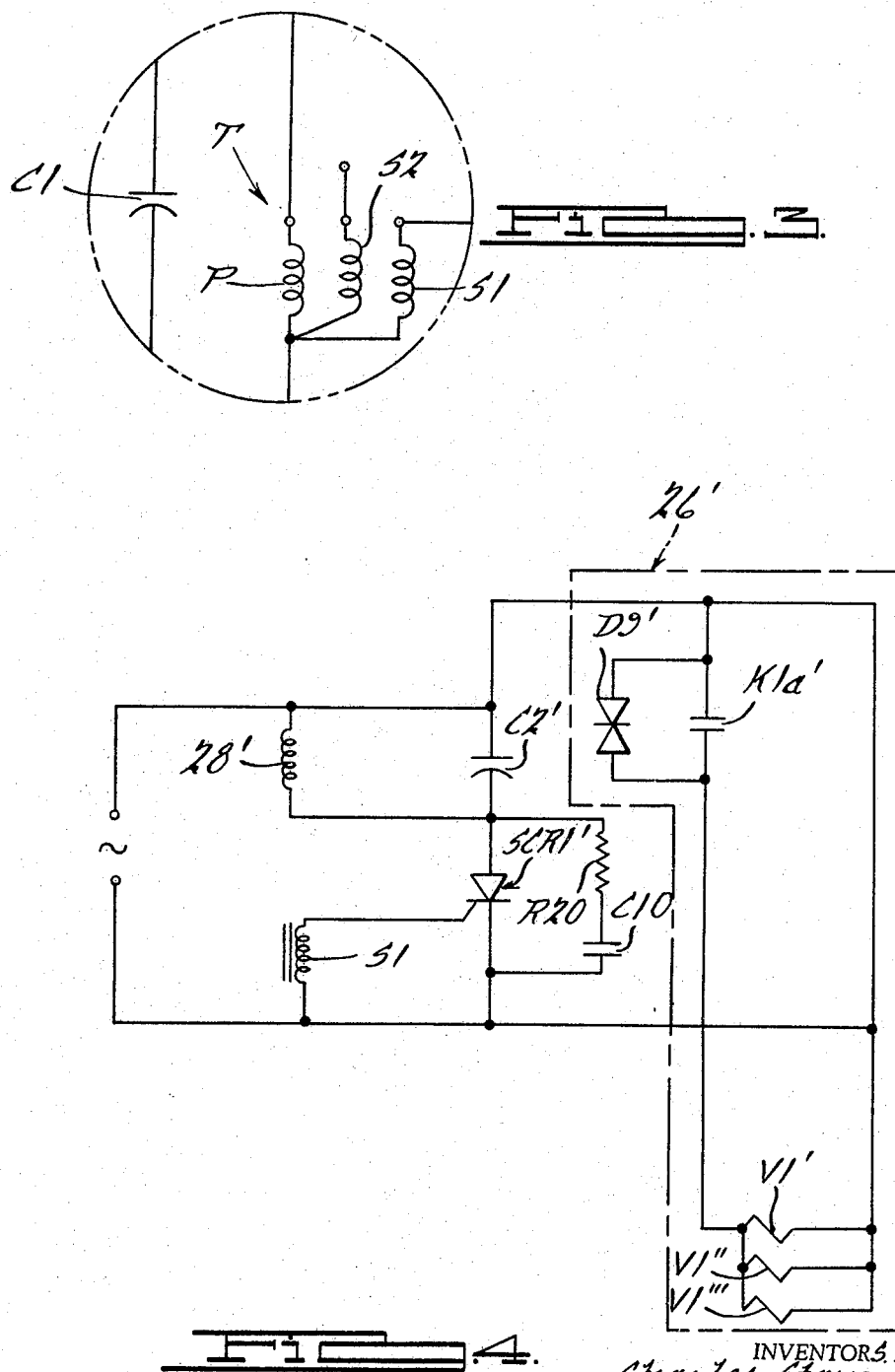

3,486,693
GAS FLOW CONTROL SYSTEM
Charles Stang, Jr., Detroit, and Wilbur S. McMann, Utica, Mich., assignors to Maxitrol Company, Southfield, Mich., a corporation of Michigan
Filed Jan. 15, 1968, Ser. No. 697,863
Int. Cl. F23n 1/02
U.S. Cl. 236—9                    21 Claims

ABSTRACT OF THE DISCLOSURE

A gas flow control system utilizing solid state devices for modulating the flow of gas to a furnace.

---

The present invention relates to gas flow systems and more particularly to a control system including means for modulating the flow of gas to a furnace.

In general, the present application is an improvement upon space heating systems of the type shown in U.S. Patent No. 3,317,136 to Stang et al., issued May 2, 1967. In the present system solid state devices are utilized whereby improved reliability can be obtained.

Therefore, it is an object of the present invention to provide an improved heat control system for space heating applications.

The present invention is particularly advantageous for space heating with forced air apparatus.

Therefore, it is another object of the present invention to provide an improved heat control system for space heating utilizing forced air apparatus.

Other objects, features, and advantages of the present invention will become apparent from the subsequent description and the appended claims, taken in conjunction with the accompanying drawings.

DESCRIPTION OF THE DRAWINGS

FIGURE 1 is a schematic, block diagram generally indicating a system of the present invention;

FIGURE 2 is a schematic diagram of a control circuit shown in FIGURE 1;

FIGURE 3 is a modified portion of a control circuit for substitution of a portion of the circuit of FIGURE 2 whereby a number of modulating valves can be simultaneously actuated;

FIGURE 4 is a circuit diagram of details of a modified circuit wherein a number of modulating valves can be actuated;

Figure 5:
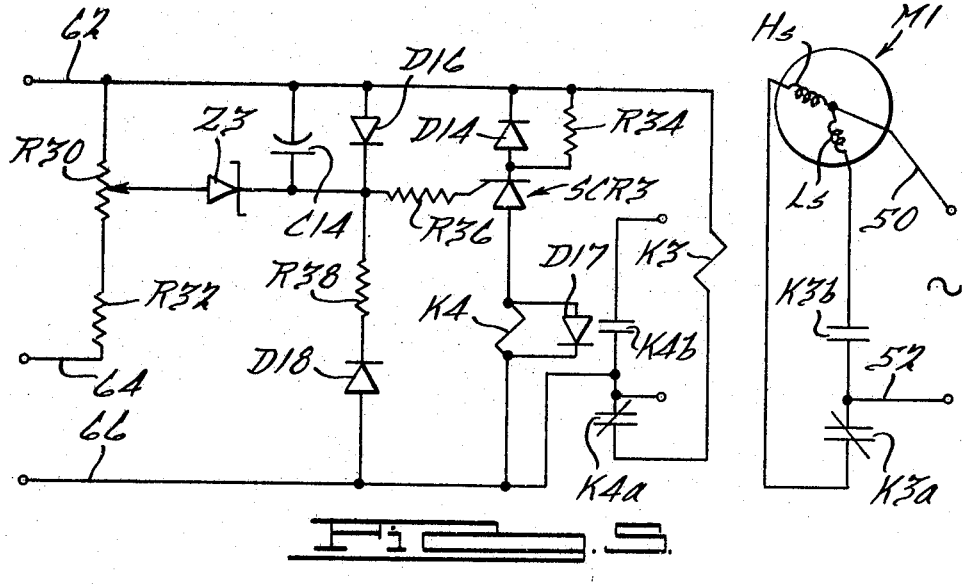
FIGURE 5 is a schematic diagram of a circuit for controlling the fan or blower speed.

Looking now to FIGURE 1, a furnace is indicated by the letter F and is shown to be connected to a blower B or, alternatively, to a refrigeration unit R. A gas line 10 is connected to the furnace F by means of a modulating valve 12 and a main valve 14. Operation of the modulating and main valves 12 and 14 is controlled by control circuit 16. The modulating valve 12 can be of the type shown in the patent to Stang, Jr. (supra) and hence the details thereof have been omitted for purposes of simplicity. The details of the control circuit are shown in FIGURE 2.

The control circuit 16 is connected to source of AC power by means of conductors 18 and 20. The control circuit generally includes a modulation circuit portion 22 (enclosed by dot-dash lines), a time delay circuit portion 24 (enclosed by dot-dash lines) and an output circuit portion 26 (enclosed by dot-dash lines). The modulating valve 12 is controlled by a solenoid coil 28. The valve 12 is of the type which is normally fully opened and is moved to more or less closed positions in response to the magnitude of the current through the coil 28 (see Stang patent supra).

The coil 28 is connected across the AC lines 18 and 20 and has one end connected to the conductor 18 via conductor 30 and has its other end connected to the conductor 20 via the anode cathode circuit of a controlled rectifier SCR 1. When the SCR 1 is not conducting, the coil 28 will not be energized and hence the modulating valve 12 will be in its wide open position. The conduction of the SCR 1 is controlled by the operation of a trigger circuit including a unijunction transistor UJ and a p-n-p transistor Q1. The transistor Q1 has its base connected to a voltage dividing network 21 which includes a temperature sensitive resistor or thermistor RT which has one end connected to conductor 20 via resistor R7 and its opposite end connected to the base of the transistor Q1. The trigger circuit for the SCR 1 is energized by half wave DC pulses provided by a half-wave rectifier diode D1 which has its anode connected to the conductor 18 and its cathode connected to a dropping resistor R1. A Zener diode Z1 acts as a voltage regulator clipping the DC pulse at R1 and is connected from the resistor R1 to conductor 20. The voltage divider network 21 is connected across the Zener Z1 and comprises a first variable resistor R2, a second variable resistor R3, a dropping resistor R4, the thermistor RT, and resistor R7 all of which are connected in series. The base of transistor Q1 is connected at the juncture of fixed resistor R4 and thermistor RT. The variable resistor R2 is utilized as a temperature selector and would have its associated wiper calibrated in degrees. The variable resistor R3 is utilized to provide means to set the calibration for the temperature selector R2. The emitter of Q1 is connected to the output side of resistor R1 via a dropping resistor R5, which in turn is serially connected with a pair of diodes D2 and D3 with another dropping resistor R6, and thence with resistor R7. The resistors R5, R6 and R7 and diodes D2 and D3 provide a voltage divider network for the bias at the emitter of Q1 which is connected between the diode D2 and resistor R5. The diodes D2 and D3 are connected to conduct the positive potential from R1 and have characteristics providing temperature compensation for Q1.

The collector of transistor Q1 is connected to the emitter of the unijunction UJ via a biasing resistor R12. The emitter of the unijunction UJ is connected to the conductor 20 via a capacitor C1. The base B2 of the unijunction UJ is connected to the high potential side of the Zener Z1 via a dropping resistor R8 while the base B1 is connected to the conductor 20 via a dropping resistor R9. The gate of the SCR1 is connected at the juncture of base B1 of the unijunction UJ and the resistor R9.

The conduction rate of Q1 determines the slope of the charging rate of capacitor C1, varying the firing time of unijunction UJ, thus providing a trigger pulse to the gate-cathode circuit of SCR1, rendering SCR1 conductive for the remaining portion of that half cycle; since alternating current is impressed across SCR1, its conduction will be extinguished after each half cycle.

The thermistor is located in the space to be heated and senses temperature changes therein. The biasing circuit for the transistor Q1 including the voltage divider network 21 is such that when the thermistor RT has a resistance of a magnitude indicating that the temperature in the space to be heated is near that selected by the temperature selector resistor R2, the transistor Q1 will be in full conduction and unijunction UJ will be firing at its earliest point in the positive half cycle resulting in maximum conduction by the SCR1 and hence maximum current to the coil 28. A capacitor C2 is connected across the coil 28 to prevent chattering resulting from the pulsed output from SCR1. With full current to the coil 28, the modulating valve 12 will be in its extreme, substantially closed postion (see patent to Stang supra). In conditions in which the temperature in the space to be heated is substantially lower than the temperature selected via the variable resistor R2, the conduction of Q1 will be insufficient to cause firing of the unijunction UJ and hence the SCR1 will not be rendered conductive. In this condition the potential across the coil 28 will be substantially zero and as a result the modulating valve 12 will be in its fully open position. With valve 12 fully opened gas flow to furnace F will be a maximum resulting in the greatest magnitude of B.t.u.'s being transmitted to the space to be heated. As the temperature increases the resistance of thermistor RT changes accordingly and conduction of Q1 will increase with low, but relatively greater conduction through emitter-collector circuit of Q1 effecting the firing rate of unijunction UJ to fire late in the time cycle of the positive half wave appearing across SCR1, resulting in a minimum portion of the half wave being transmitted to the coil 28. As the temperature increases and the change in resistance of RT is greater, the conduction through Q1 will be greater resulting in unijunction UJ triggering SCR1 earlier in the half cycle and providing a current of increased magnitude through the coil 28. Thus, in this way modulation of the opening of modulating valve 12 will occur. While the modulating valve 12 provides for variations in gas flow to furnace F, the main valve 14 is an "on-off" valve and controls the connection or disconnection of the modulating valve 12 and furnace F to the gas supply line 10.

The main valve 14 is controlled by conduction of a second controlled rectifier SCR2. SCR2 has its principal electrodes connected between the alternating potential lines 18 and 20 and has its cathode connected to line 18 via a diode D8 which is connected in parallel with a dropping resistor R14. Diode D8 prevents SCR2 from turning on prematurely in response to minor voltage fluctuation immediately after it has been extinguished; thus D8 prevents SCR2 from hunting around its point of non-conduction and hence prevents unwanted cycling of valve 14. The anode of SCR2 is connected to conductor 20 via an energizing coil of a relay K1 which has a capacitor C4 connected thereacross to prevent chattering. The valve 14 can be of a conventional normally, closed construction and is actuated by energization of a valve coil V1. Valve coil V1 is connected across the AC lines 18 and 20 via normally open contacts K1a for the relay K1 and a switch SW1. A pair of back-to-back diodes D9 are connected across the contacts K1a to provide for arc suppression. Thus, upon conduction of SCR2, current to the coils of relay K1 will cause the normally open contacts K1a to be closed whereby the coil V1 of the valve 14 will be energized causing the valve 14 to be open. The gate of the SCR2 is triggered by means of current through a capacitor C3 which is parallelly connected with a diode D6 from the conductor 18 to the gate of the SCR2 via a dropping resistor R13. The diode D6 has its anode connected to conductor 18 and acts as a clamp across capacitor C3. R13 is connected to conductor 20 via a series circuit defined by a dropping resistor R15 and a diode D7 which has its anode connected to conductor 20. SCR2 is biased to normally conduct and will be conducting on half cycles alternate to the half cycles on which SCR1 would be conductive. Thus with SCR2 normally conducting the main valve 14 will normally be opened. The control of the conduction of SCR2, however, is provided by SCR1 and its associated circuiting.

A Zener diode Z2 has its anode connected to the junction of resistor R13 and capacitor C3 and its cathode connected to the wiper of a potentiometer R10. R10 is a part of a voltage divider network comprising a fixed resistor R11 which is connected across the capacitor C2 and hence senses the potential across the coil 28 of the modulating valve 12. When SCR1 is nonconducting and no current is flowing through the coil 28 and hence the valve 28 is wide open, i.e. unmodulated, there will be no potential sensed at the wiper of potentiometer R10, and hence, the conductive state of SCR2 will be unaffected and it will remain conductive. However, upon full conduction of SCR1, i.e. when the valve 12 has been fully modulated to its closed position, the potential at the wiper of potentiometer R10 will be such as to render Z2 conductive causing the potential at the gate of the SCR2 to drop resulting in SCR2 being rendered nonconductive. The potential across coil 28 at which this occurs can be set by the wiper of potentiometer R10. With SCR2 non-conductive, the coil of relay K1 will be deenergized resulting in the contacts K1a opening and the coil V1 of the main valve 14 being deenergized whereby the main valve 14 will be closed. In this condition then, fuel to the furnace F through gas line 10 will be completely cut off. Note that in the previously described patent to Stang, Jr., the modulating valve 12 is provided such as to have a partially open condition even in its most fully modulated position. Even in this position, however, the current through the coil 28 can increase as the firing angle of the SCR1 is continuously modified. Thus, gas flow can occur at the fully modulated position of valve 12 for some time before the main valve 14 will be closed. However, at this minimal flow rate the degree of over-shoot of the selected temperature is minimized.

As previously described, the modulating valve 12 is provided to be open at a minimum opening even in its fully modulated condition. A minimum opening is selected to insure adequate flow of fuel without backfire and also to permit adequate flow of fuel for starting purposes. However, in some instances it is desirable that the modulating valve 12 be temporarily actuated to its full open position for starting purposes. This can be accomplished with the time delay circuit portion 24.

The time delay circuit portion 24 has an RC time circuit comprising a capacitor C6 and a variable resistor R16 which are connected in series with a conductor 34 which is connected to the anode of SCR2. The coil for a relay K2 is serially connected from the capacitor C6 to conductor 20 via a conductor 36. Thus when SCR2 is conducting, current will flow through the coil of relay K2 initially causing its energization. The coil of relay K2 is connected in parallel to a capacitor C5 and to a diode D10 which has its anode connected to the conductor 36. The capacitor C5 and diode D10 generally filter out the ripples and minimize chatter of the relay K2. Normally open contacts K2a of relay K2 are connected from conductor 36 to the gate of SCR1 via a conductor 38. Thus upon energization of the coil for relay K2, contacts K2a will be closed whereby the gate of SCR1 will be grounded preventing SCR1 from firing. Thus, when SCR2 is rendered conductive the main valve 14 is actuated to its open position. The initial flow of current through the time delay circuit portion 24 will energize the coil for relay K2 to cause contacts K2a to be closed. However, the action of the timing circuit including the variable resistor R16 and capacitor C6 is such that continued conduction of SCR2 will eventually charge C6 whereby the current flow therethrough will be at a minimum and of insufficient magnitude to maintain the coil of relay K2 energized. At this time the contacts K2a will then be opened whereby the gate of SCR1 will no longer be held at ground potential, i.e., potential of conductor 20, thus permitting SCR1 to be rendered conductive whereupon modulation of valve 12 can occur in the manner previously described. The time of energization of the relay coil K2 (the time which SCR1 will be maintained nonconductive) can be selected by adjusting the variable resistor R16.

The circuit as shown in FIGURE 2 can be made operable either to provide heating or cooling by means of switch SW1. Switch SW1 in the position shown (with the contact in the H position) will define a completed circuit for the conductor 18 to the relay contacts K1a and the coil V1. In the alternate position of switch SW1, i.e.

with the contact in the C position, the conductor 18 is disconnected from the contacts K1a and solenoid coil V1 and is connected to an alternate circuit including normally closed contacts K1b and solenoid coil V2 for actuating refrigeration apparatus. The contacts K1b will be open in response to current to the solenoid coil K1 and hence will operate in a reverse manner as contacts K1a, such as to interrupt cooling when the temperature sensed by the thermistor RT is at or below the temperature selected by the temperature selector resistor R2.

Thus, the circuit shown and described thus far utilizes solid state devices for controlling the modulation of modulating valve 12 thereby providing for a reliable construction; the circuitry is also unique with regard to the interaction between the circuitry controlling the actuation of the main valve in combination with the modulating valve 12 as well as in the time delay circuit portion 24 and the alternate cooling provisions of the circuit.

It is contemplated that in some applications more than one modulating valve will be controlled by the same modulation circuit portion 22. FIGURE 3 illustrates such a modification to FIGURE 2. The apparatus shown in FIGURE 3 included in the dot-dash circle replaces the apparatus shown within the dotted circle 40 of FIGURE 2 whereby the resistor R9 is replaced by the primary P of an isolation transformer T having secondary windings S1 and S2. Secondary winding S1 is connected to the gate of SCR1 while the secondary S2 is connected to the gate of a different controlled rectifier (such as SCR1) for controlling the modulation of current to a different coil (similar to coil 28 for modulating valve 12). In this way a plurality of modulating valves such as 12 could be actuated by the same modulating circuit portion 22.

In FIGURE 4, circuitry for one such modulating valve coil system is shown. In the description of the embodiment of FIGURE 4 components similar to those described and shown in FIGURE 2 will be given the same printed designations. The coil 28' is connected in parallel with a capacitor C2' and is actuated by the SCR1'. SCR1' has its gate circuit connected to the secondary S1 such that SCR1' will be rendered conductive in response to pulses through the primary P of the transformer T (FIGURE 3). Contacts K1a' are in parallel with suppressor diode D9' and are connected to solenoid coil V1' for the main valve (such as 14). A plurality of similar coils V1'' and V1''' could be similarly actuated simultaneously with the main valve coil V1' whereby a plurality of main valves could be actuated with a single modulating valve and by one SCR1'. The principal electrodes of SCR1' are parallelly connected with a bypass circuit comprising the resistor R20 and a capacitor C10, which acts as a bypass for high frequency surges. The remaining components of the circuitry of FIGURE 4 can be identical to that of FIGURE 2, i.e., the output circuit portion 26, etc., and have been omitted for purposes of simplicity.

As noted in the patent to Stang, Jr. (supra), with modulating systems utilizing forced air, the fan or blower is generally continuously running. It is desirable in such systems at some stage of the modulating cycle at which the amount of heat being produced by the furnace is reduced, that the speed of the fan be reduced. Apparatus for reducing the fan speed at a selected time in the modulation cycle is shown in FIGURE 5.

A dual speed split phase motor M1 is diagrammatically shown to have its windings connected across a source of alternating potential by means of conductors 50 and 52. The split phase motor M1 has a low speed field winding LS and a high speed field winding HS (both of which are diagrammatically shown) and both of which are connected together at one end to the conductor 50. The high speed field winding HS is connected to the conductor 52 through a normally closed set of contacts K3a. The low speed field winding LS is connected to the conductor 52 via a normally open set of contacts K3b. The circuit for the split phase motor M1 is normally in the condition as shown in which contacts K3a are closed and contacts K3b are open, whereby motor M1 will be running at high speed. Associated circuitry shown in FIGURE 5 is provided such that at some selected time during the modulation, the contacts K3a will be open and contacts K3b will be closed thereby disconnecting the high speed windings HS from and connecting the low speed winding LS to the source of alternating potential whereby the motor M1 will run at a lower speed. The associated control circuit 60, FIGURE 5, has a pair of conductors 62 and 64 which are connected directly across the modulating coil 28 on the circuit of FIGURE 2 with conductor 62 being connected to conductor 18 and with conductor 64 being connected to the anode of SCR1. A conductor 66 is connected to the conductor 20. The control circuit 60 functions in a manner similar to that of the output circuit portion 26. A potentiometer R30 is serially connected with a resistor R32 between conductors 62 and 64 and hence define a voltage divider across the modulating coil 28 with the potential at the wiper of the potentiometer R30 sensing a preselected portion of the potential across the modulating coil 28. A control rectifier SCR3 has its principal electrodes connected between alternating potential lines 62 and 66 and has its cathode connected to line 62 via a diode D14 which is parallelly connected to a dropping resistor R34. Diode D14 and resistor R34 function in a manner similar to diode D8 and resistor R14 in conjunction with the operation of SCR2. The cathode of SCR3 is connected to conductor 66 via an energizing coil of a relay K4 which has a diode D17 connected thereacross to minimize chatter. The relay K4 controls a first pair of normally closed contacts K4a and a second pair of normally open contacts K4b. Contacts K4a are connected from the line 66 to the line 62 via an energizing coil of a relay K3 which controls the contacts K3a and K3b associated with the split phase motor M1. The contacts K4b have one end connected to the line 66 and another end for alternate connection to the circuitry in FIGURE 6 which functions in a manner to be described. SCR3 is normally biased into a conducting state by means of a biasing resistor R36 which is connected from the gate of the SCR3 to the conductor 62 via a capacitor C14. A diode D16 is connected across capacitor C14 and serves a clamping function similar to diode D6 relative to the capacitor C3 in FIGURE 2. The resistor R38 is connected to the conductor 66 via a diode D18; it is also connected to the resistor R36 and functions in the same manner as the resistor R15 and diode D7 in FIGURE 2. The SCR3 with the circuit heretofore described is normally biased to be conductive and as such the relay coil K4 will be energized whereby the contacts K4a will be opened and the relay coil K3 will be deenergized. In this condition, the circuitry associated with the split phase motor M1 will be in the condition as shown with the high speed field winding HS being energized through the closed contact K3a. A Zener diode Z3 functions in a similar manner to the Zener Z2 of FIGURE 2 and has its cathode connected to the wiper of the potentiometer R30 and its anode connected to the juncture of the diode D16 and capacitor C14. At some selected point in the modulation, i.e. at a selected potential across the modulating valve coil 28, the Zener diode Z3 will conduct, dropping the potential at the gate of the SCR3 thereby rendering SCR3 nonconductive. In this condition, relay coil K4 will be deenergized whereby the contacts K4a will return to their normally closed position, and the relay coil K3 will then be energized. Upon energization of the coil K3, the contacts K3a will be opened and contacts K3b will be closed thereby disconnecting the high speed field windings HS from the source of alternating potential and connecting the low speed field windings LS to the source of alternating potential resulting in the motor M1 turning at a lower speed. The point in the modulating cycle at which this shift from high speed to low speed operation of the motor M1 occurs can be selected by adjusting the position of a wiper relative to the potentiometer R30.

It should be noted that the actuation of the SCR3 does not necessarily occur in time coincidence with that of SCR2, since they serve different purposes. Also, the same modulation circuit portion 22 in FIGURE 2 and hence the same thermistor RT provides signals for controlling both the modulation of the valve 12 and the modulation of the motor M1 driving the blower or fan.

Figure 6:
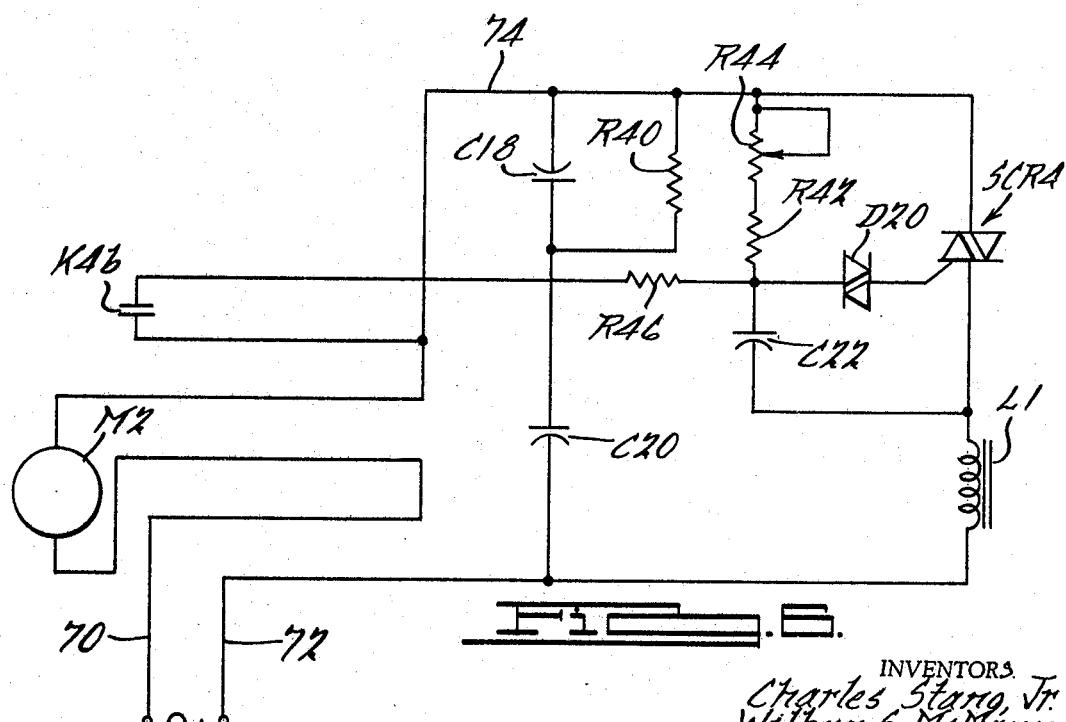
FIGURE 6 is a schematic diagram of a different circuit for use with the circuit of FIGURE 5 for controlling the fan or blower speed.

Looking now to FIGURE 6, a circuit, alternative to the circuit of split phase motor M1, is shown in cooperation with the associated control circuitry 60. The contact K4b, of FIGURE 5, is shown in FIGURE 6. A motor M2 of the permanent split capacitor type is utilized in which variations in voltage to the stator will cause the speed of the motor M2 to vary accordingly. The motor M2 is energized by a source of alternating potential via a pair of conductors 70 and 72 with the motor M2 having one side connected to the conductor 70 and having its other side connected to one of the principal electrodes of the controlled rectifier triac SCR4 by means of a conductor 74. The other principal electrode of the triac SCR4 is connected to the conductor 72 through an RF choke L1. A pair of capacitors C18 and C20 are serially connected across conductors 72 and 74 with a resistor R40 connected across a capacitor C18. The capacitors C18 and C20 and resistor R40 provide for RF suppression. The triac SCR4 has its gate electrode connected by a pair of parallelly connected, oppositely polarized diodes D20 to the conductor 74 by means of serially connected resistor R42 and variable resistor R44. Resistors R42 and R44 are connected in parallel to an alternate biasing circuit which comprises resistor R46 and the contacts K4b. A bypass capacitor C22 is connected from the juncture of resistors R42 and R46 to the juncture of SCR4 and choke L1. Under non-modulating conditions with the SCR3 (FIGURE 5) in its fully conducting condition, the relay coil K4 will be energized whereby the normally open contacts K4b will be closed. In the closed position, the resistor R46 is placed directly across the biasing resistors R42 and R44 such as to reduce the effective impedance of that circuit whereby the triac SCR4 will be placed in its fully conductive condition resulting in maximum voltage being delivered to the stator windings of the motor M2. In this condition the motor M2, and hence the associated blower or fan, will be driven at its maximum speed. At a selected point in the modulation at which the controlled rectifier SCR3 is rendered nonconductive, the relay coil K4 will be deenergized and contacts K4b will be returned to their normally open condition in which case the parallel connection of resistor R46 will be opened with the bias at the gate of the triac SCR4 being reduced. Variable resistor R44 is selectively adjusted to provide for the triac SCR4 to conduct less than the magnitude was set when R46 is in the circuit whereby the voltage to the motor M2 will be reduced resulting in a reduction in its speed and hence reduction in the fan or blower speed. Thus, again the fan speed will be modulated generally in accordance with modulation of the modulating valve 12. When only two speeds are shown for the operation of motor M2 it can be appreciated that by the use of additional circuitry further steps in motor speed could be provided.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a system for controlling the temperature in a space to be heated by a furnace having a gas burner and including valve means for controlling the flow of the gas from a source to the burner including modulating means for controllably varying the flow of gas to the burner in response to a first control signal and "on-off" means having one condition for interrupting the flow of gas and another condition for permitting the flow of gas to the burner and being responsive to a second control signal for being in said one or said other condition, said system comprising: temperature selecting means for providing a first electrical signal having a magnitude representative of a selected temperature for the space to be heated, temperature sensing means for sensing the temperature in the space to be heated and providing a second electrical signal having a magnitude varying in accordance with variations in the magnitude of the sensed temperature, signal means for providing said first control signal in response to the magnitudes of said first and second electrical signals and for providing said second control signal in response to the magnitudes of said first and second electrical signals.

2. The system of claim 1 with the modultaing means including a modulating valve having an opening for gas flow varying in size in accordance with the magnitude of said first control signal, said signal means responsive to the magnitude of said first control signal for providing said second control signal.

3. The system of claim 2 with said signal means providing said second control signal for placing said "on-off" means in said one condition in response to said first control signal having a preselected magnitude.

4. The system of claim 3 with the modulation valve having a solenoid coil with the opening of the modulation valve varying in accordance with the current through the solenoid coil, said signal means including circuit means for connecting the first control signal across the solenoid coil.

5. The system of claim 4 with said signal means comprising a first solid state controlled conduction device serially connected to the solenoid coil, a solid state asymmetric current conducting device having a pair of principal electrodes and a control electrode, a first impedance selectively variable for providing said first electrical signal, a second impedance having an electrical characteristic varying in magnitude in accordance with variations in temperature for providing said second electrical signal, first circuit means for connecting said first and second impedances to said control electrode, second circuit means for connecting said principal electrodes to said first controlled conduction device.

6. The system of claim 5 with said first conduction device having a pair of principal electrodes serially connected to the solenoid coil and having a gate electrode and being rendered conductive by trigger pulses at said gate electrode, second circuit means comprising trigger circuit means connected from said principal electrodes of said asymmetric device to said gate electrode for providing said trigger pulses to said gate electrode in response to the output at said principal electrodes of said asymmetric device.

7. The system of claim 6 with said signal means comprising supply means for providing a pulsating direct potential to said asymmetric device with said trigger pulses being timed relative to the pulsating direct potential.

8. The system of claim 7 with said "on-off" means including a main valve actuated by a second coil, said signal means including a second controlled conduction device having a pair of second principal electrodes and a second gate electrode and third circuit means serially connecting said second principal electrodes to the second coil, fourth circuit means including a voltage divider network connected across the solenoid coil, and fifth circuit means connecting a selected point on said voltage divider network to said second gate whereby the conduction of said second conduction device will be controlled by the potential across the solenoid coil.

9. The system of claim 7 with said asymmetric device being a transistor, said first and second conduction devices being SCR's and with said trigger circuit means including a unijunction transistor.

10. The system of claim 1 having a motor for forcing air from the furnace into the space to be heated and further comprising sixth circuit means connected to the motor for modulating the motor speed in accordance with said first and said second electrical signals.

11. The system of claim 10 with said sixth circuit means modulating the motor speed in accordance with the magnitude of said first control signal.

12. The system of claim 11 with the motor being operable at two speeds and with said sixth circuit means switching the motor speed at a preselected magnitude of said first control signal.

13. The system of claim 1 further including cooling means and seventh circuit means responsive to said first and said second electrical signals for actuating said cooling means.

14. The system of claim 9 having a motor for forcing air from the furnace into the space to be heated and further comprising sixth circuit means connected to the motor for modulating the motor speed in accordance with the magnitude of said first control signal with the motor being operable at two speeds and with said sixth circuit means switching the motor speed at a preselected magnitude of said first control signal, cooling means, and seventh circuit means responsive to said first and said second electrical signals for actuating said cooling means.

15. The system of claim 14 further including a plurality of modulating valves and first solenoid coils all actuated in response to said first and said second electrical signals.

16. The system of claim 15 further including a plurality of main valves and second coils all actuated in response to said first and said second electrical signals.

17. The system of claim 3 with the "on-off" means including a main valve and with the modulating valve being modulated from a fully opened position to a minimum opened position with the minimum opened position being sufficient to prevent backfire, the modulating valve being modulated from its fully opened to its minimum opened position in response to a portion of the total variation in the magnitude of said first control signal, the main valve being actuated to its "off" position in response to said first control signal having a magnitude outside of said portion of the total variation in magnitude.

18. The system of claim 17 having a motor for forcing air from the furnace into the space to be heated and further comprising sixth circuit means connected to the motor for modulating the motor speed in accordance with said first and said second electrical signals, said sixth circuit means modulating the motor speed in accordance with the magnitude of said first control signal within said portion of the total variation in magnitude.

19. In a forced air system for controlling the temperature in a space to be heated by a furnace having a burner energized by a source of gas and having a motor energizable for forcing heated air from the furnace into the space to be heated, said system comprising: modulating means for controllably varying the flow of gas from the source to the burner in response to variations in the magnitude of a first control signal, temperature selection means for providing a first electrical signal representative of a selected temperature for the space to be heated, temperature sensing means for sensing the temperature in the space to be heated and providing a second electrical signal responsively to the magnitude of the sensed temperature, signal means for providing said first control signal varying in magnitude in response to variations in the magnitude of said first and second electrical signals, circuit means for normally continuously energizing the motor to drive the fan and for modulating the speed of the motor in response to said first and second electrical signals.

20. The system of claim 19 with said circuit means modulating the speed of the motor in accordance with the magnitude of said first control signal.

21. The system of claim 20 with the motor being operable at two speeds and with said circuit means switching the motor speed at a preselected magnitude of said first control signal.

References Cited

UNITED STATES PATENTS

| | | |
|---|---|---|
| 2,076,768 | 4/1937 | Denison. |
| 2,120,803 | 6/1938 | Grant. |
| 2,331,476 | 10/1943 | Jones _____ 236—9 |
| 2,596,290 | 5/1952 | Ryder et al. _____ 236—11 |
| 3,317,136 | 5/1967 | Stang et al. |

EDWARD J. MICHAEL, Primary Examiner

U.S. Cl. X.R.

236—11, 78

PO-1050
(5/69)

UNITED STATES PATENT OFFICE
CERTIFICATE OF CORRECTION

Patent No. 3,486,693      Dated December 30, 1969

Inventor(s) Charles Stang, Jr., and Wilbur S. McMann

It is certified that error appears in the above-identified patent and that said Letters Patent are hereby corrected as shown below:

Column 1, line 21, after "Stang" add --Jr.,--
Column 2, line 1, after "Stang" add --Jr.,--
Column 3, line 2, delete "postion" and substitute therefor --position--
Column 3, line 2, after "Stang" add --Jr.,--
Column 7, line 55, delete "was" and substitute therefor --as--
Column 7, lin 60, delete "When" and substitute therefor --While--
Column 8, line 18, delete "modultaing" and substitute therefor --modulating

SIGNED AND
SEALED
JUN 23 1970

(SEAL)
Attest:

Edward M. Fletcher, Jr.
Attesting Officer

WILLIAM E. SCHUYLER, JR.
Commissioner of Patents